(12) United States Patent
Nakamichi (10) Patent No.: US 7,726,255 B2
(45) Date of Patent: Jun. 1, 2010

(54) DISPLAY DEVICE FOR VEHICLE

(75) Inventor: Hideaki Nakamichi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 206 days.

(21) Appl. No.: 12/005,529

(22) Filed: Dec. 27, 2007

(65) Prior Publication Data

US 2008/0163811 A1 Jul. 10, 2008

(30) Foreign Application Priority Data

Jan. 9, 2007 (JP) .............................. 2007-001564

(51) Int. Cl.
*G01P 5/00* (2006.01)
*G01D 13/02* (2006.01)

(52) U.S. Cl. ....................... 116/62.4; 116/62.1; 116/300

(58) Field of Classification Search ....... 116/62.1–62.4, 116/284, 334, 298, 300, 301; 340/441, 459, 340/461; 73/114.38, 114.42, 114.48, 114.52, 73/114.53
See application file for complete search history.

(56) References Cited

U.S. PATENT DOCUMENTS

| | | | | |
|---|---|---|---|---|
| 2,297,435 A | * | 9/1942 | Schwager | ................ 73/114.52 |
| 2,723,642 A | * | 11/1955 | Manning | .................... 116/62.4 |
| 3,068,695 A | * | 12/1962 | Cohn et al. | .................... 73/244 |
| 4,085,610 A | * | 4/1978 | Erwin, Jr. | ................ 73/114.42 |
| 4,384,479 A | * | 5/1983 | Handtmann | ............... 73/114.53 |
| 4,475,380 A | * | 10/1984 | Colovas et al. | ........... 73/114.53 |
| 4,841,902 A | * | 6/1989 | Gubin | ........................ 116/62.4 |
| 6,694,806 B2 | * | 2/2004 | Kumagai et al. | ......... 73/114.52 |
| 7,114,379 B2 | * | 10/2006 | Emord | ..................... 73/114.52 |
| D552,121 S | * | 10/2007 | Carl et al. | ................... D14/488 |
| 2007/0090932 A1 | * | 4/2007 | Takato | ........................ 340/438 |

FOREIGN PATENT DOCUMENTS

| GB | 2052744 A | * | 1/1981 |
|---|---|---|---|
| JP | 03-056827 | | 3/1991 |

\* cited by examiner

*Primary Examiner*—Amy Cohen Johnson
(74) *Attorney, Agent, or Firm*—Carrier, Blackman & Associates, P.C.; William D. Blackman; Joseph P. Carrier (57) ABSTRACT

The present invention provides a display device for a vehicle that includes a speed display unit that displays a vehicle speed on a speed scale; and a supply-rate display unit that displays a supply rate that is a fuel supply amount per a give time on a supply-rate scale. In this display device for a vehicle, the speed scale and the supply-rate scale are arranged in parallel with a constant distance therebetween.

10 Claims, 8 Drawing Sheets

DISPLAY DEVICE FOR VEHICLE

CROSS-REFERENCE TO RELATED APPLICATION

This application claims the foreign priority benefit under 35 U.S.C. §119 of Japanese Patent Application No. 2007-001564 filed on Jan. 9, 2007, the disclosure of which is incorporated herein by reference.

BACKGROUND OF THE INVENTION

1. Field of the Invention

The present invention relates to a display device for a vehicle for displaying a fuel amount supplied to an engine that drives the vehicle, as well as a vehicle speed and a rotation rate of the engine.

2. Description of the Related Art

In order to drive an engine to provide power for a vehicle, petroleum fuel such as gasoline and light oil is used. To enhance economical efficiency during an engine driving operation, it has been desired to reduce fuel consumption, that is, to enhance fuel efficiency.

Fuel efficiency depends on driver's driving behaviors, and his or her economical driving may result in a better fuel efficiency. In order to encourage a driver to perform an economical driving operation, it has been suggested to provide a driver with a display showing fuel consumption as well as a current fuel-injection rate, as disclosed in JP H03-56827 A.

However, JP H03-56827 A discloses a display of a fuel efficiency calculated based on past average values of vehicle speed and fuel consumption. It has been difficult to determine how a current driving operation such as an accelerator pedal stroking affects the fuel efficiency.

Since fuel-injection rate significantly varies depending on the vehicle speed, the fuel efficiency during a higher-speed driving at a greater fuel-injection rate may be equal to that during a lower-speed driving at a smaller fuel-injection rate. Thus, it is difficult to determine whether or not the current driving operation such as an accelerator pedal stroking is economically enough, simply by observing the current fuel-injection rate by sight.

SUMMARY OF THE INVENTION

It is an object of the present invention to provide a display device for a vehicle to facilitate for a driver to determine whether or not the current driving operation such as an accelerator pedal stroking is economical enough.

One aspect of the present invention provides a display device for a vehicle including a speed display means that displays a vehicle speed on a speed scale; and a supply-rate display means that displays a supply rate that is a fuel supply amount per a give time on a supply-rate scale, wherein the speed scale and the supply-rate scale are arranged in parallel with a constant distance therebetween.

Another aspect of the present invention provides a display device for a vehicle including a rotation-rate display means that displays on a rotation-rate scale a rotation rate of an engine for the vehicle; and a supply-rate display means that displays on a supply-rate scale a supply rate that is a fuel supply amount per a given time, wherein the rotation-rate scale and the supply-rate scale are arranged in parallel with a constant distance therebetween.

Other features and advantages of the present invention will become more apparent from the following detailed descriptions of the invention when taken in conjunction with the accompanying exemplary drawings.

DETAILED DESCRIPTION OF THE PREFERRED EMBODIMENTS

Hereinafter, descriptions will be provided on an embodiment of the present invention with reference to drawings.

Figure 1:
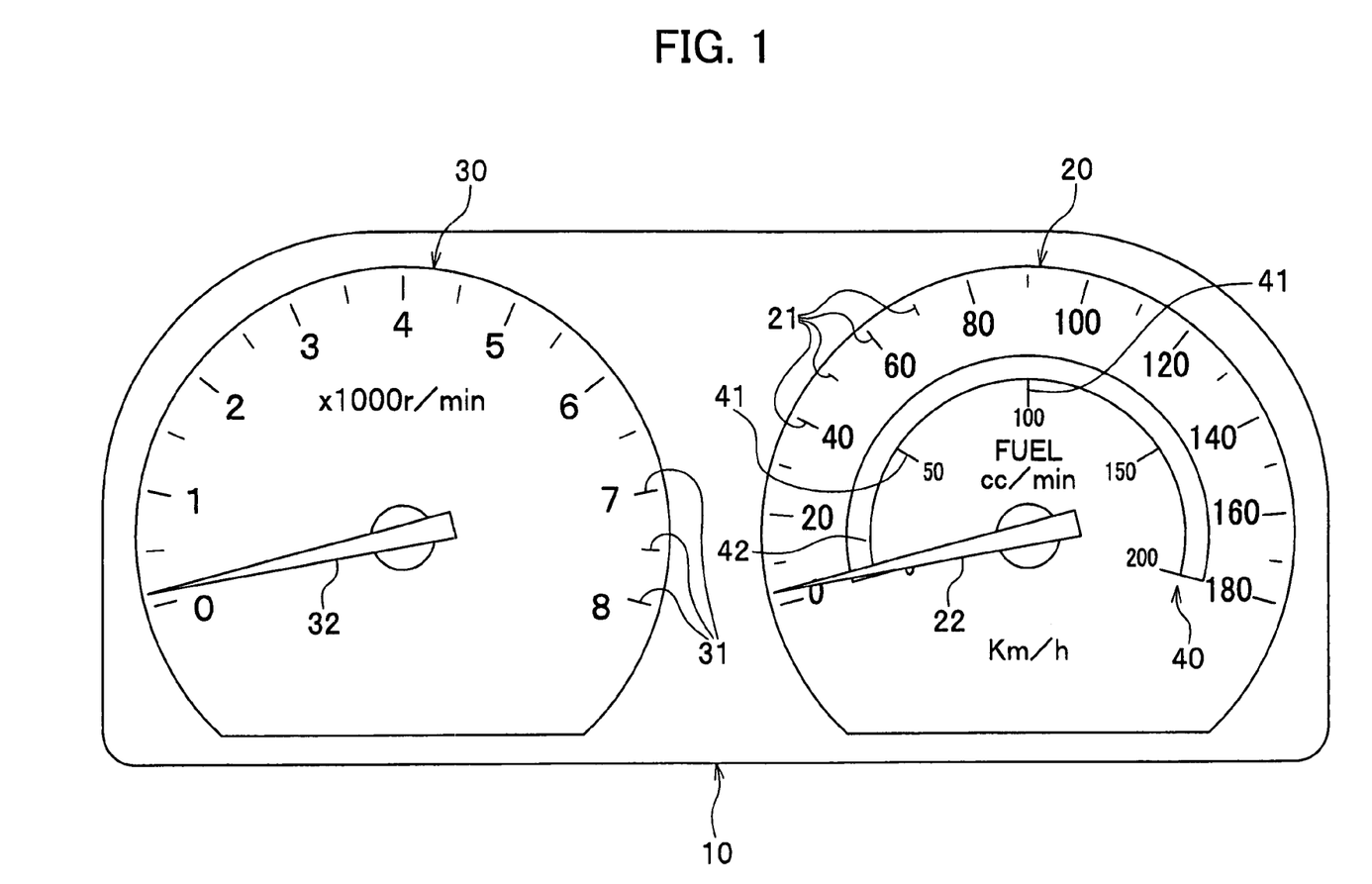
FIG. 1 is a front view that shows an appearance of a display device for a vehicle according to one embodiment of the present invention.

FIG. 1 is a front view showing an appearance of a display device for a vehicle according to one embodiment of the present invention.

The display device for a vehicle 10 includes a speedometer 20 that displays a vehicle speed as a speed display means, a tachometer 30 that displays a rotation rate of an engine (power plant for a vehicle), and a fuel-injection rate gauge 40 that displays supply amount based on the fuel supply amount per a give time, etc. The speedometer 20 and the tachometer 30 are laterally arranged on the right and left sides, respectively. The fuel-injection rate gauge 40 and the speedometer 20 are integratedly provided in such a manner that a speed scale 21 of the speedometer 20 and an injection-rate scale 41 of the injection-rate gauge 40 are arranged in an arc in parallel with a constant distance therebetween.

On the speedometer 20, there is provided the speed scale 21 (also referred to as a "speed scale") having scale marks in an arc clockwise from 0 to 180 km/h at an interval of 10 km/h along with auxiliary scale marks at an interval of 2 km/h (not shown).

On the speedometer 20, there is also provided a speed indicator 22. The speed indicator 22 rotatably moves about a center of the arc formed by the speed scale 21. The speed indicator 22 is controlled by a control unit (not shown, hereinafter) to indicate a scale mark of the speed scale 21 corresponding to a current speed of a vehicle that is detected by a vehicle speed sensor (not shown, hereinafter).

On the tachometer 30, there is a rotation-rate scale 31 (also referred to as a "rotation-rate scale") with scale marks in an arc clockwise from 0 to 8000 rpm at an interval of 500 rpm along with auxiliary scale marks provided at an interval of 100 rpm (not shown).

There is also provided a rotation-rate indicator 32 on the tachometer 30. The rotation-rate indicator 32 rotatably moves about a center of the arc formed by the rotation-rate scale 31. The rotation-rate scale 31 is controlled by a control unit to indicate a scale mark of the rotation-rate scale 31 corresponding to a current vehicle speed that is calculated by a rotation-rate calculator (not shown).

On the fuel-injection rate gauge 40, there is provided an injection-rate scale 41 in an arc about the same center of the arc formed by the speed scale 21. The injection-rate scale 41 (also referred to as a "supply-rate scale") has scale marks clockwise from 0 to 200 cc/min at an interval of 50 cc/min.

On the fuel-injection rate gauge 40, there is also provided with an injection-rate display 42 in an arc along the arc formed by the injection-rate scale 41. The injection-rate display 42 may be a liquid crystal display, for example, and shows a current fuel-injection rate in a bar-graph manner, as marked in slash lines in FIGS. 2 to 7. The injection-rate display 42 is controlled by the control unit to indicate a scale mark of the injection-rate scale 41 corresponding to a current fuel injection rate for the engine (i.e. supply rate) that is calculated by the fuel-injection rate calculator (not shown).

A disposition of the injection-rate scale 41 relative to the speed scale 21 is defined in the following manner.

It can be assumed that the 10.15 mode fuel consumption is predefined in a vehicle provided with the display device for a vehicle 10. By multiplying an injection rate at each scale mark of the injection-rate scale 41 by the 10.15 mode fuel consumption, a vehicle speed to achieve the 10.15 mode fuel consumption at a corresponding injection rate is calculated. Then, the injection-rate scale 41 is arranged relative to the speed scale 21 in such a manner that each scale mark of the scale 41 meets a scale mark of the speed scale 21 that agrees with a corresponding calculated vehicle speed. A position of the injection-rate scale 41 relative to the speed scale 21 is indicated by a scale mark of the fuel-injection rate gauge 40 that meets a straight line radially extending toward the center of the arc from a scale mark of the speed scale 21 that indicates a current vehicle speed. In other words, this position can be read from a scale mark of the injection-rate scale 41 that meets a center line of the speed indicator 22 of the speed scale 21.

For example, in the vehicle according to the present embodiment, the 10.15 mode fuel consumption is 15 km/l, and the calculated vehicle speed at an injection rate of 50 cc/min is 45 km/h. The respective calculated vehicle speeds at the injection rates of 100 cc/min, 150 cc/min and 200 cc/min are 90 km/h, 135 km/h and 180 km/h.

Therefore, the scale marks of the injection-rate scale 41 that indicate injection-rates of 50 cc/min, 100 cc/min, 150 cc/min and 200 cc/min correspond to the respective scale marks of the speed scale 21 that indicates 45 km/h, 90 km/h, 135 km/h and 180 km/h.

According to the display device for a vehicle 10 as constituted above, it is possible to display a position of the current injection rate with reference to a display position of the speed indicator 22. As described hereinafter, displaying a position of the current injection-rate with reference to a display position of the speed indicator 22 allows a driver to perceive a driving operation for a more economical driving.

Figure 2:
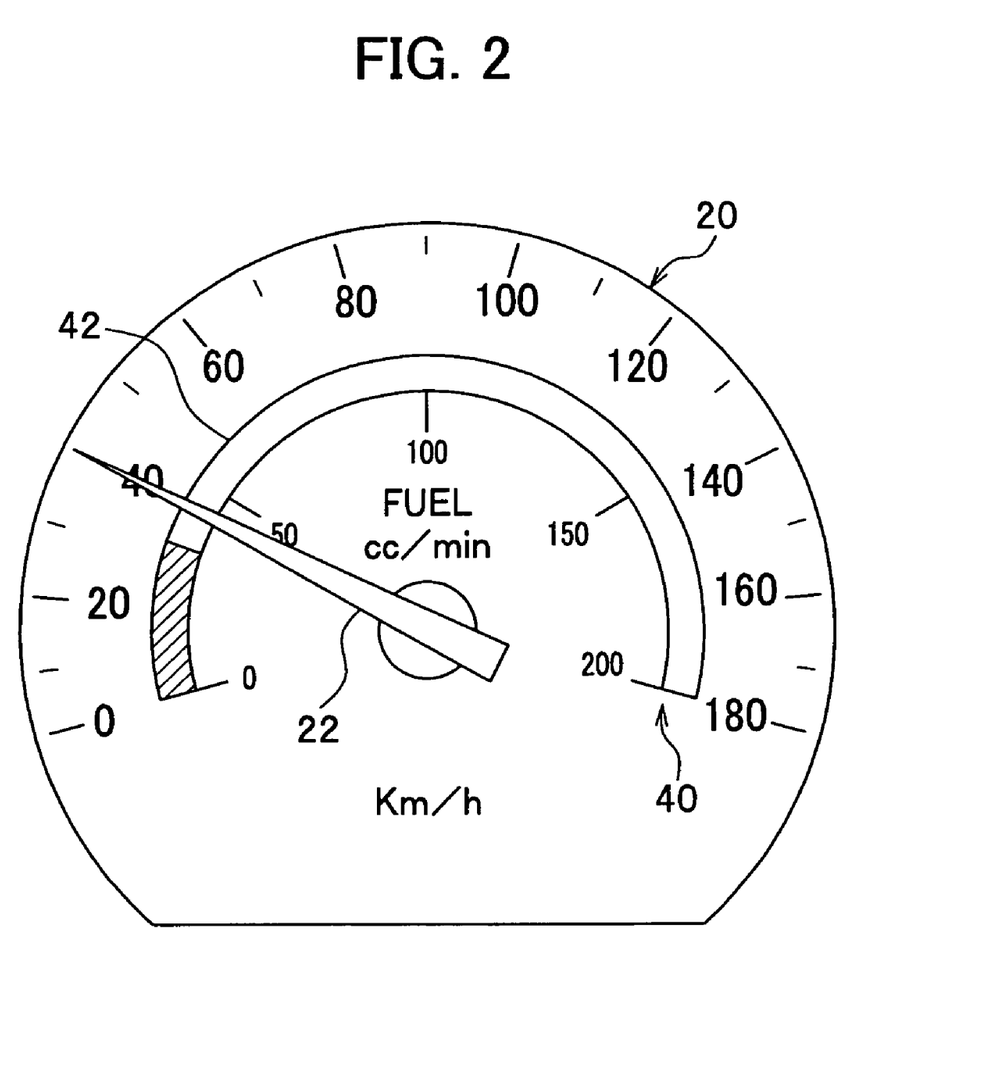
FIG. 2 is a drawing that shows a display of a speedometer and a fuel-injection rate gauge at a vehicle speed of 40 km/h.
Figure 3:
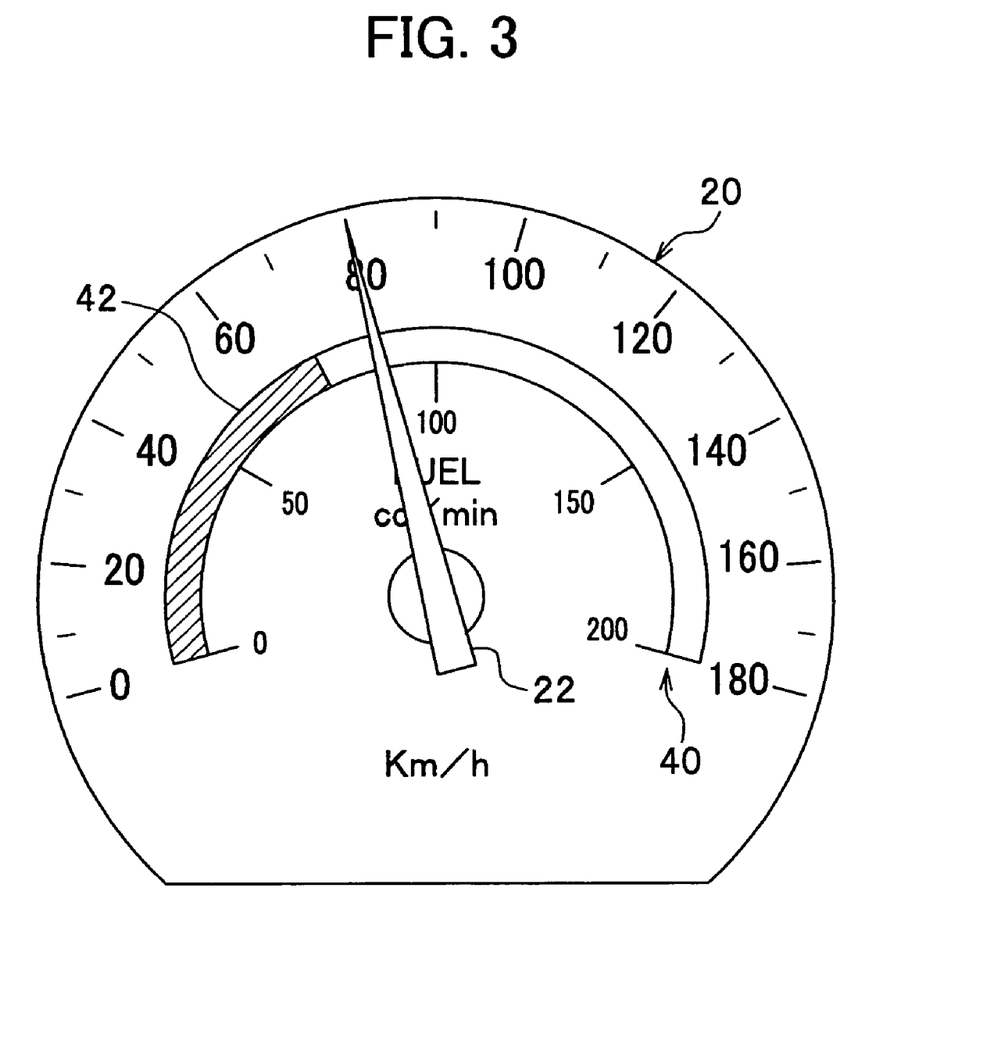
FIG. 3 is a drawing that shows a display of the speedometer and the fuel-injection rate gauge at a vehicle speed of 80 km/h.
Figure 4:
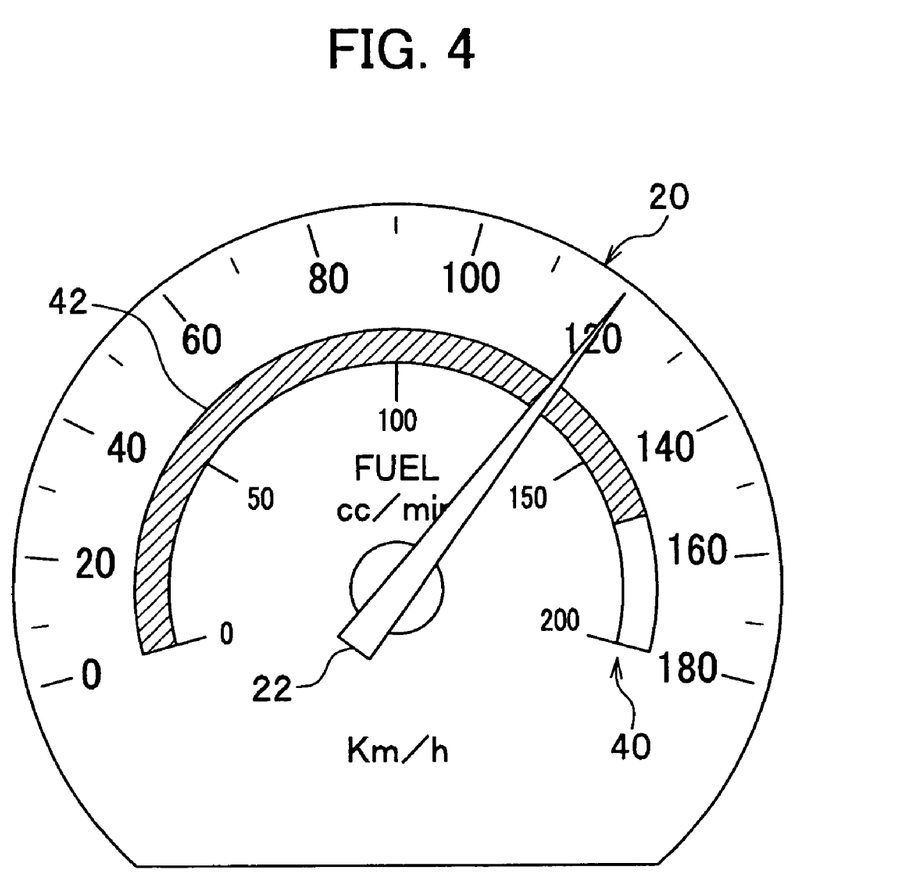
FIG. 4 is a drawing that shows a display of the speedometer and the fuel-injection rate gauge at a vehicle speed of 120 km/h.
Figure 5:
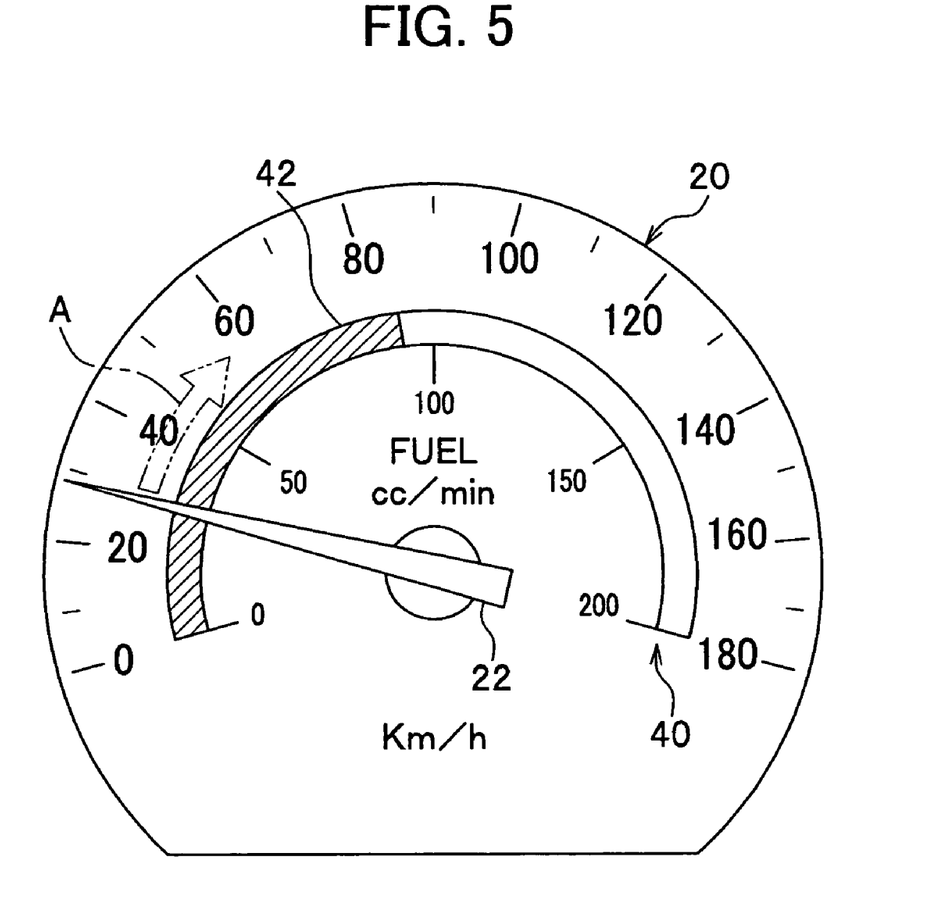
FIG. 5 is a drawing that shows a display of the speedometer and the fuel-injection rate gauge during an acceleration driving operation.
Figure 6:
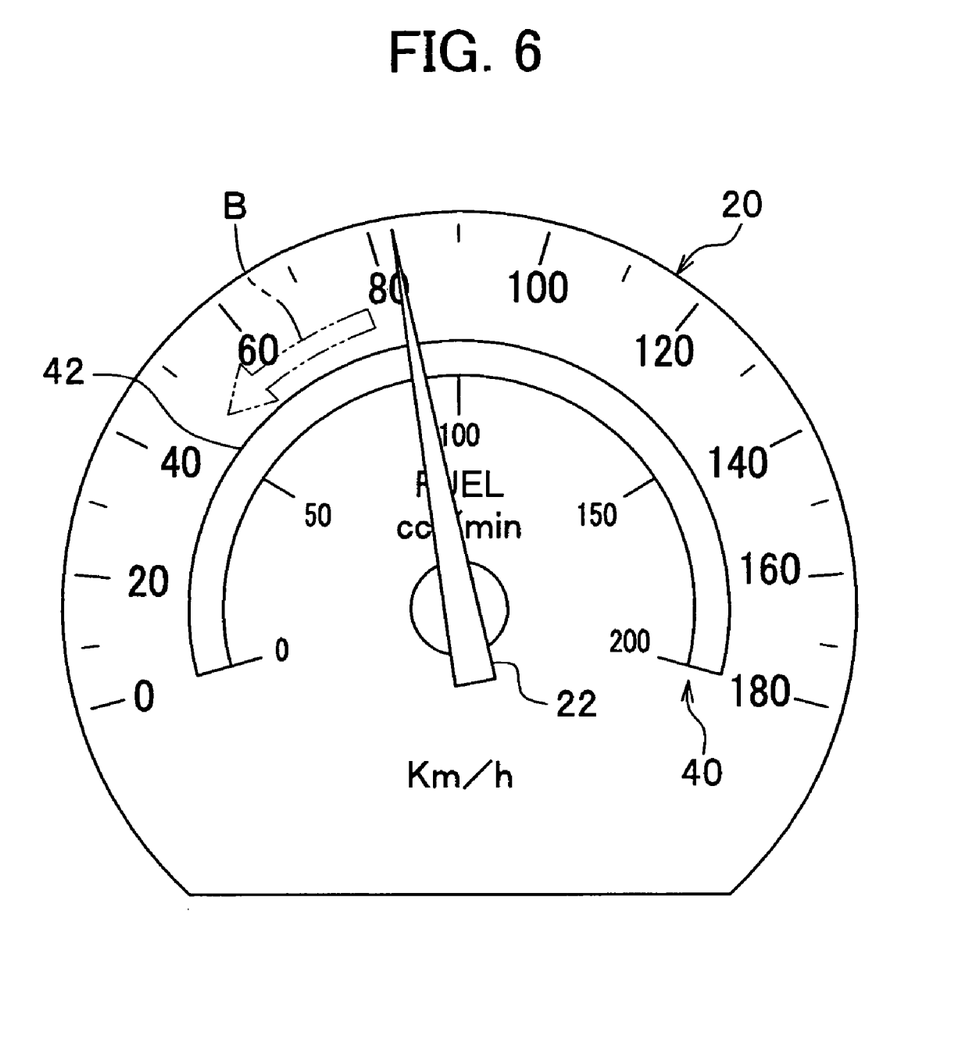
FIG. 6 is a drawing that shows a display of the speedometer and the fuel-injection rate gauge during an inertia traveling operation.
Figure 7:
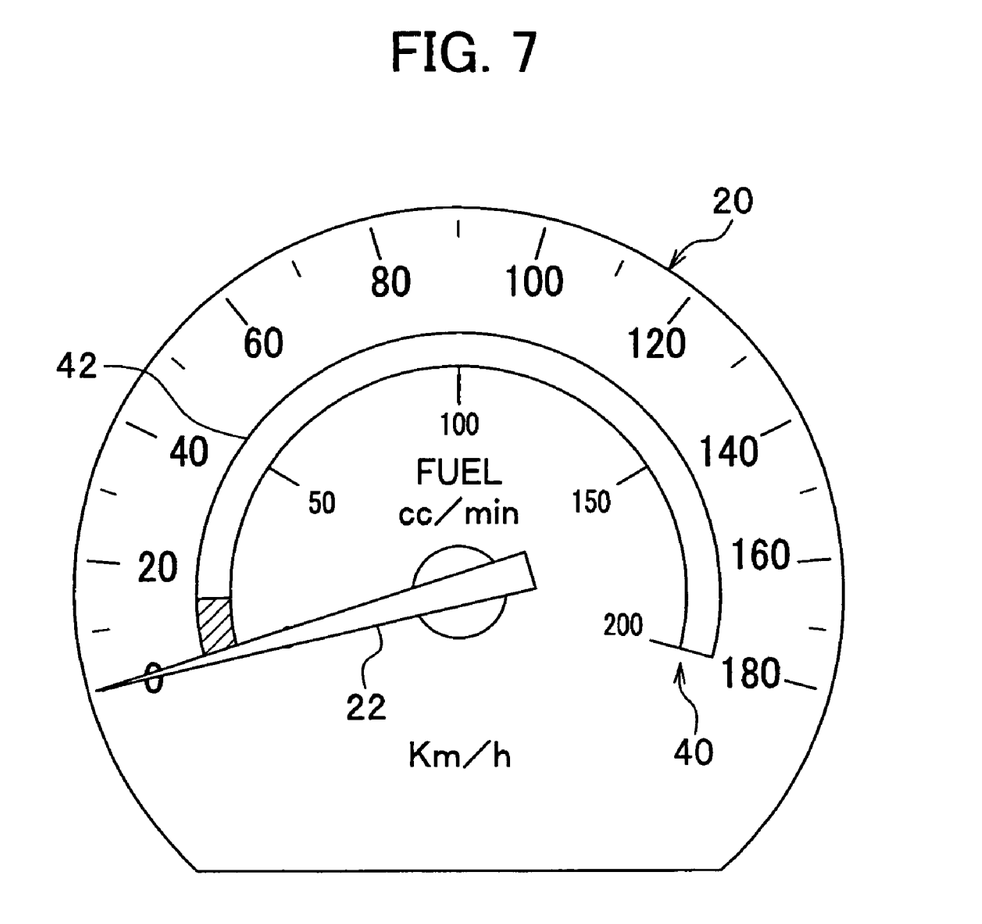
FIG. 7 is a drawing that shows a display of the speedometer and the fuel-injection rate gauge during an idling operation.

With reference to FIGS. 2 to 7, there will be provided descriptions on each relation of a vehicle speed, an injection-rate and corresponding fuel consumption in various driving operation patters. FIG. 2 is a drawing of a display of the speedometer 20 and the fuel-injection rate gauge 40 at a vehicle speed of 40 km/h. FIG. 3 is a drawing of a display of the speedometer 20 and the fuel-injection rate gauge 40 at a vehicle speed of 80 km/h. FIG. 4 is a drawing of a display of the speedometer 20 and the fuel-injection rate gauge 40 at a vehicle speed of 120 km/h. FIG. 5 is a drawing of a display of the speedometer 20 and the fuel-injection rate gauge 40 during an acceleration driving operation. FIG. 6 is a drawing of a display of speedometer 20 and the fuel-injection rate gauge 40 during an inertia traveling operation. FIG. 7 is a drawing of a display of the speedometer 20 and fuel-injection rate gauge 40 during an idling operation.

A vehicle provided with the display device for a vehicle 10 according to the present embodiment is designed such that, when the vehicle travels at a cruising speed of approximately 40 to 80 km/h, it achieves the maximum fuel efficiency. For example, during a driving at a constant speed within a range from 40 to 80 km/h, the fuel consumption is 18 km/l, which is higher than the 10.15 mode fuel consumption.

An injection-rate during a driving at a constant speed of 40 km/h is 37.0 cc/min. Thus, at this time, the fuel-injection rate gauge 40 displays a lower injection-rate (37.0 cc/min) than an injection-rate at a position that meets the speed indicator 22 (i.e. 44.4 cc/min), as shown in FIG. 2.

An injection rate during a driving at a constant vehicle speed of 80 km/h is 74.1 cc/min. Thus, the fuel-injection rate gauge 40 at this time displays a lower injection-rate (74.1 cc/min) than an injection-rate at a position that meets the speed indicator 22 (i.e. 88.9 cc/min), as shown in FIG. 3.

As described above, a driver can easily perceive by sight that the current injection rate shown by the fuel-injection rate gauge 40 is lower than a position of the injection rate that meets the speed indicator 22, so that the driver can determine that his or her driving operation is economical enough.

If the vehicle travels out of the speed range from 40 to 80 km/h which provides the maximum fuel efficiency, the greater the air resistance increases, the lower the fuel efficiency becomes. According to the present embodiment, for example, fuel consumption during a driving at a constant vehicle speed of 120 km/h is 12 km/l, which is lower than the 10.15 mode fuel consumption.

An injection rate during a driving at a constant vehicle speed of 120 km/h is 166.7 cc/min. Thus, the fuel-injection rate gauge 40 at this time displays a higher injection-rate (166.7 cc/min) than an injection-rate at a position that meets the speed indicator 22 (i.e. 133.3 cc/min), as shown in FIG. 4.

As described above, a driver can easily perceive by sight that the current injection rate shown by the fuel-injection rate 40 is higher than a position of the injection rate that meets the speed indicator 22, so that the driver can determine that his or her driving operation is not economical enough.

During an acceleration driving operation of the vehicle, the injection rate instantaneously increases in response to a demand by an accelerator pedal stroking, and thereafter, the vehicle speed is accelerated to catch up with this injection rate. At this time, the fuel-injection rate gauge 40 and the speedometer 20, therefore, display such that the injection rate increases first, and then the speed indicator 22 follows the injection rate, as shown by the arrow A in FIG. 5.

The greater the accelerator pedal stroking amount becomes, the greater the distance between the injection rate that meets the speed indicator 22 and the current injection rate of the fuel-injection rate gauge 40 becomes. Accordingly, this allows a driver to determine how the fuel efficiency works now, depending on the accelerator pedal stroking amount, that is, the degree of acceleration.

Meanwhile, during an inertia traveling operation, when the accelerator pedal is completely released, a fuel cut operation is performed to stop the fuel supply. Thus, the injection rate becomes instantaneously zero, and the vehicle speed is gradually decreased. At this time, the fuel-injection rate gauge 40 and the speedometer 20, therefore, display such that the injection rate becomes zero first, and then the speed indicator 22 follows the injection rate, as shown by the arrow B in FIG. 6.

During such an inertia traveling operation, the fuel efficiency becomes the highest. Therefore, as the time of an inertia traveling operation becomes longer, the fuel efficiency becomes better.

During an idling operation, it is displayed that the vehicle speed is zero, and the injection rate is more than 0 cc/min, which allows a driver to perceive by sight that such an idling operation lowers the fuel efficiency (see FIG. 7). Similarly, when an air conditioner is powered, it is displayed that the value of the injection rate becomes further greater, which also allows the driver to perceive by sight that such an air conditioning operation also lowers the fuel efficiency.

In the above descriptions on the display device 10 for a vehicle according to the present embodiment, it has been explained that the display device 10 has such a constitution in which the injection-rate display 42 is arranged along the speed scale 21, or the injection-rate display 42 may be arranged along the rotation-rate scale 31.

Figure 8:
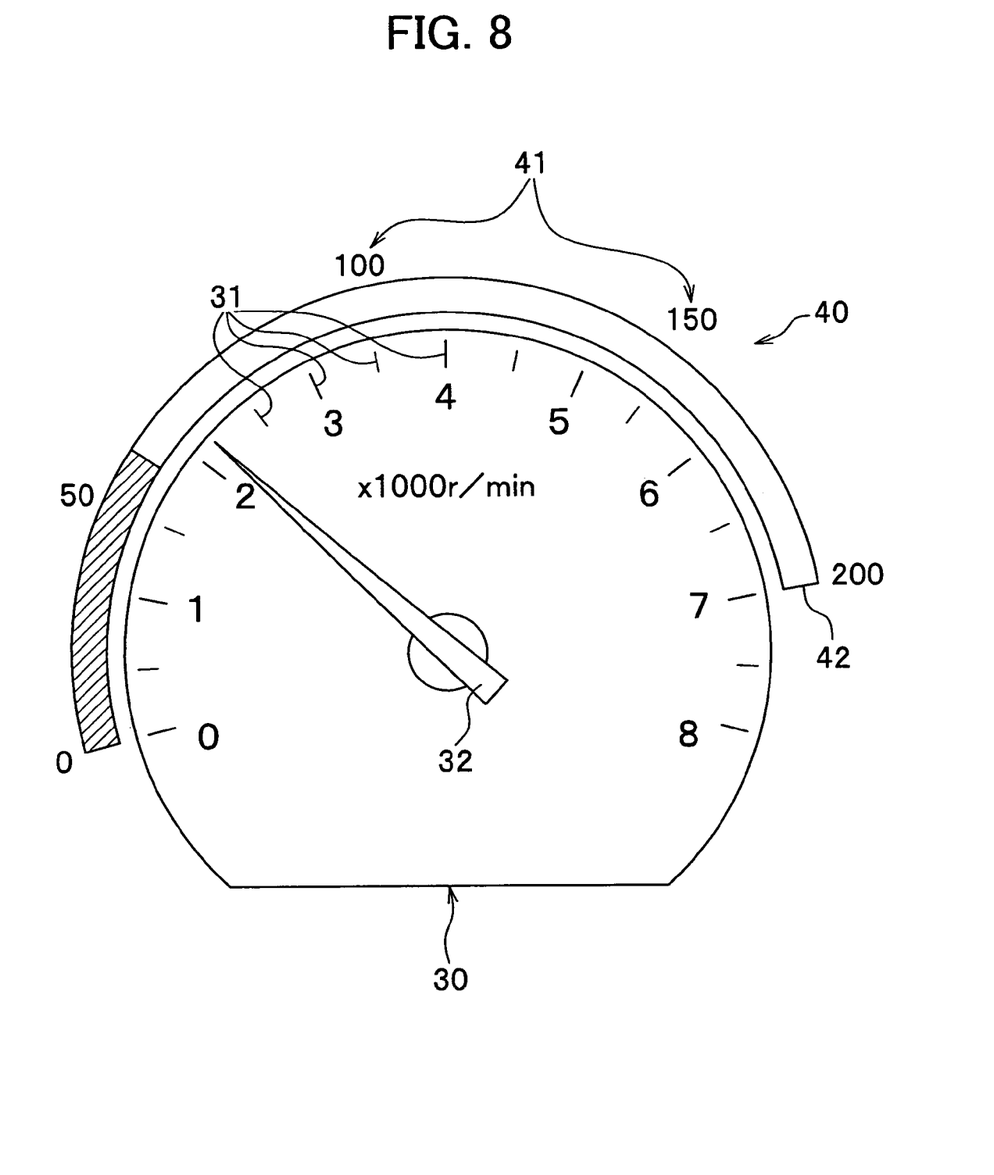
FIG. 8 is a drawing that shows a tachometer around which a fuel-injection rate gauge is provided in a variation of the present embodiment.

For example, as shown in FIG. 8, the injection-rate display 42 may be constituted to be arranged above the rotation-rate scale 31 along the arc thereof. In such a constitution, it is possible for a driver to lay eyes on increase or decrease of the injection rate with reference to the rotation rate, which allows a driver to perceive a more economical driving operation.

A disposition of the injection-rate scale 41 relative to the rotation-rate scale 31 is defined in the following manner.

It is assumed that the 10.15 mode fuel consumption is predefined in a vehicle provided with the display device for a vehicle 10, similar to the above embodiment. By multiplying an injection rate at each scale mark of the injection-rate scale 41 by the 10.15 mode fuel consumption, a vehicle speed to achieve the 10.15 mode fuel consumption at a corresponding injection rate is calculated. Based on the calculated vehicle speed, a rotation rate to achieve the 10.15 mode fuel consumption at a corresponding injection rate is calculated from circumference of a tire obtained from its outer diameter, reduction gear ratio, etc. The injection-rate scale 41 is arranged relative to the rotation-rate scale 31 in such a manner that each scale mark of the scale 41 meets a scale mark of the rotation-rate scale 31 that indicates a corresponding calculated rotation rate of the rotation-rate scale 31. A position of the injection-rate scale 41 relative to the rotation-rate scale 31 is indicated by a scale mark of the fuel-injection rate gauge 40 that substantially meets a straight line radially extending away from the center of the arc from a scale mark of the rotation-rate scale 31 that indicates a current rotation-rate. In other words, this position can be read from a scale mark of the injection-rate scale 41 that substantially meets a line extending from a center line of the rotation-rate indicator 32 of the rotation-rate scale 31.

In the present embodiment, the speedometer 20 is provided with the speed scale 21, and the fuel-injection rate gauge 40 is provided with the injection-rate scale 41. However, even if either of the scale 21 and the scale 41 misses its scale marks, the same effect of the present embodiment can be brought. Even without either of the scales 21 and 41, it is possible to perceive by sight whether or not a position of the current injection rate exceeds a position of the current vehicle speed, and how far their positions are depart from each other, thereby to allow a driver to perceive a more economical driving operation.

In the present embodiment, the injection-rate scale 41 is arranged relative to the speed scale 21 such that a scale mark of an injection rate of interest meets a corresponding calculated vehicle speed to achieve 10.15 mode fuel consumption on the scale 21. However, this calculated speed may be defined based on any other fuel consumption mode.

If a calculated vehicle speed is obtained by use of the 10.15 mode fuel consumption, a driving operation of which fuel efficiency is higher than the 10.15 mode fuel consumption can be displayed as an economical driving operation. Alternatively, if a calculated vehicle speed is obtained based on an average fuel consumption among various driving operation patterns, a driving operation of which fuel efficiency is higher than this average fuel consumption can be displayed as an economical driving operation. In addition, instead of using a measured value used in the 10.15 mode fuel consumption, a calculated vehicle speed can be defined by using a theoretical value or an ideal value of fuel consumption.

In the present embodiment, the injection-rate scale 41 is arranged relative to the speed scale 21 such that the position of the injection-rate scale 41 meets a corresponding calculated vehicle speed on the speed scale 21, and it may be arranged regardless of the position of the speed scale 21. In various driving operations, it is possible for a driver to perceive whether or not he or she is currently performing an economical driving operation when observing by sight the current injection rate with reference to a display position of the current vehicle speed.

The present embodiment uses such an injection-rate display 42 that indicates the current injection rate in an arc shaped bar-graph manner, and the display 42 may have an indicator similar to that of the speedometer 20 so as to show the current injection rate. The present embodiment uses such a speedometer 20 that has a speed indicator 22 to indicate a current vehicle speed, and the speedometer 20 may have an arc shaped display to show a current vehicle speed, similar to the fuel-injection rate gauge 40.

In the present embodiment, the speed scale 21 and the injection-rate scale 41 as well as the injection-rate display 42 are arranged in an arc, and they may not be arranged in an arc.

For example, the speed scale 21 and the injection-rate scale 41 may be arranged in a straight line, a curved line or a combination thereof, and the injection-rate display 42 arranged in a straight line, a curved line or a combination thereof may be used. If the speed scale 21 and the injection-rate scale 41 are arranged in a combination of a straight line and a curved line, two closest points to each other may be used as a corresponding position relative to each other.

In the case of a straight line arrangement, it may be preferable that the speed scale 21 and the injection-rate scale 41 are arranged in a straight line parallel to each other, and the injection-rate display 42 is also arranged in a straight line parallel to the injection-rate scale 41. In the case of a curved line arrangement, it may be preferable that the speed scale 21 and the injection-rate scale 41 are arranged in parallel along a curved line, and the injection-rate display 42 is arranged along a curved line parallel to the injection-rate scale 41. Alternatively, the speed scale 21 may be arranged relative to the injection-rate scale 41 at an inconstant distance, and it is possible to perceive by sight an approximate injection rate relative to a vehicle speed as far as the scales 21 and 41 are arranged along each other.

In the present embodiment, the speed scale 21 and the injection-rate scale 41 are constituted such that their values increase clockwise so that a current vehicle speed and a current injection-rate are displayed to increase clockwise, and they may be displayed to increase anti-clockwise. If the speed scale 21 and the injection-rate scale 41 are arranged in a straight line or a curved line, a current vehicle speed and a current injection-rate may be displayed to increase in the same direction.

As described above, according to the display device for a vehicle of the present invention, it is facilitated to perceive that, as a current fuel supply rate increases with reference to a display position of a current vehicle speed, a driving operation becomes less economical; and as a current fuel supply rate decreases with reference to a display position of a current vehicle speed, a driving operation becomes more economical. In addition, it is facilitated to determine by sight whether or not a current driving operation such as an accelerator pedal stroking is economical enough with reference to a calculated vehicle speed based on a given fuel consumption.

Furthermore, it is possible to easily perceive by sight that, as a current fuel supply increases with reference to a display position of a current rotation rate, a current driving operation becomes less economical; and as a current fuel supply rate decreases with reference to a display position of a current rotation rate, a current driving operation becomes more economical. In addition, it is facilitated to determine by sight whether or not a current driving operation such as an accelerator pedal stroking is economical enough with reference to a rotation rate calculated based on a given fuel consumption.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A display device for a vehicle, said display device comprising:
   a speed display unit including a speed scale for displaying a vehicle speed, and a speed indicator for indicating a vehicle speed on the speed scale; and
   a supply-rate display unit that displays a supply rate of a current fuel supply amount per a given time on a supply-rate scale,
   wherein:
   the speed scale and the supply-rate scale are arranged in parallel with a constant distance therebetween; said speed scale and said supply-rate scale being corresponding with each other, and
   said speed indicator is also operable to indicate a corresponding fuel injection rate at a given vehicle speed;
   during operation of said vehicle, at a given vehicle speed, comparison of said current fuel supply amount per a given time with said corresponding fuel injection rate provides whether said vehicle being operated at a desirable fuel consumption level.

2. A display device for a vehicle according to claim 1, wherein
   a position of the supply-rate scale of the supply-rate display unit is arranged relative to a position of the speed scale of the speed display unit that agrees with a speed of the vehicle calculated from the supply rate and a given fuel consumption.

3. A display device for a vehicle according to claim 1, wherein
   the speed scale is arranged in an arc, and is provided with said speed indicator that moves about an approximate center of the arc.

4. A display device for a vehicle according to claim 1, wherein said speed scale and said supply-rate scale correspond with each other based on a 10.15 mode fuel consumption.

5. A display device for a vehicle according to claim 1, wherein the speed-scale and the supply-rate scale are arranged such each of the speed-scale and the supply-rate scale increase in the same direction.

6. A display device for a vehicle according to claim 1, wherein the speed-scale and the supply-rate scale are arranged in straight lines.

7. A display device for a vehicle according to claim 1, wherein the speed-scale and the supply-rate scale are each arranged in a curved arc.

8. A display device for a vehicle, said display device comprising:
   a rotation-rate display unit including a rotation-rate scale for displaying a rotation rate of an engine of the vehicle, and a rotation rate indicator for indicating a rotation rate of an engine on the rotation-rate scale; and
   a supply-rate display unit that displays on a supply-rate scale a supply rate of a current fuel supply amount per a given time,
   wherein the rotation-rate scale and the supply-rate scale are arranged in parallel with a constant distance therebetween; said rotation-rate scale and said supply-rate scale being corresponding with each other, and
   said rotation rate indicator is also operable to indicate a corresponding fuel injection rate at a given rotation rate of the engine;
   during operation of said vehicle, at a given rotation rate of the engine, comparison of said current fuel supply amount per a given time with said corresponding fuel injection rate provides whether said vehicle being operated at a desirable fuel consumption level.

9. A display device for a vehicle according to claim 8, wherein
   a position of the supply-rate scale of the supply-rate display unit is arranged relative to a position of the rotation-rate scale of the rotation-rate display unit that agrees with a rotation rate of the engine of the vehicle calculated from a given fuel consumption, a tire diameter and a reduction gear ratio of a reduction gear unit of the vehicle, and the supply rate.

10. A display device for a vehicle according to claim 8, wherein said rotation-rate scale and said supply-rate scale correspond with each other based on a 10.15 mode fuel consumption.

* * * * *